UNITED STATES PATENT OFFICE.

EPHRAIM M. ROYAL, OF COLLINGDALE, AND ISAAC B. TURNER, OF PHILADELPHIA, PENNSYLVANIA.

COMPOSITION FOR COATING CHILLS.

SPECIFICATION forming part of Letters Patent No. 425,346, dated April 8, 1890.

Application filed December 28, 1888. Serial No. 294,886. (No model.)

*To all whom it may concern:*

Be it known that we, EPHRAIM M. ROYAL, residing at Collingdale, in the county of Delaware, and ISAAC B. TURNER, residing in the city and county of Philadelphia, State of Pennsylvania, have invented a new and useful Improvement in Compositions for Coating Chills, which improvement is fully set forth in the following specification.

Our invention consists of a novel coating for chills, more particularly car-wheels and rolls, consisting of plumbago, alcohol or wood-naphtha, and shellac.

The shellac is dissolved in the alcohol or naphtha, and the plumbago then added thereto, forming a preparation of the consistency of mixed paint. In using our invention we oil the face of a chill, and then coat the same with the preparation above stated, and then proceed as usual.

By this invention we are enabled to pour hotter metal than heretofore, and we avoid straining and cracking of the casting and produce an article which is clean, solid, strong, and free from honey-combs.

The proportions we may take is as follows: Plumbago, twelve ounces; alcohol or wood-naphtha, one gallon; shellac, one pint.

We are aware that it is not new to coat chills for the purpose set forth with a preparation including lamp-black and disclaim the same; but we are not aware that the specific composition, as herein set forth, is old, wherein plumbago is used, instead of lamp-black, the advantages of plumbago over lamp-black or charcoal being that it will not burn out like lamp-black or charcoal, which latter renders the preparation comparatively useless. While the employment of wood-naphtha in the composition is preferable any kind of methylic or other non-explosive alcohol may be used.

Having thus described our invention, what we claim as new, and desire to secure by Letters Patent, is—

The composition for coating chills, consisting of a mixture of plumbago, alcohol, and shellac in the proportions set forth.

EPHRAIM M. ROYAL.
ISAAC B. TURNER.

Witnesses:
JOHN A. WIEDERSHEIM,
A. P. JENNINGS.